US012705818B2

(12) United States Patent
Knodt et al.

(10) Patent No.: US 12,705,818 B2
(45) Date of Patent: Aug. 11, 2026

(54) CONSISTENT LATENT DIFFUSION FOR MESH TEXTURING

(71) Applicant: Tencent America LLC, Palo Alto, CA (US)

(72) Inventors: Julian Knodt, Palo Alto, CA (US); Xifeng Gao, Tallahassee, FL (US)

(73) Assignee: TENCENT AMERICA LLC, Palo Alto, CA (US)

( * ) Notice: Subject to any disclaimer, the term of this patent is extended or adjusted under 35 U.S.C. 154(b) by 298 days.

(21) Appl. No.: 18/644,044

(22) Filed: Apr. 23, 2024

(65) Prior Publication Data

US 2025/0329100 A1 Oct. 23, 2025

(51) Int. Cl.
*G06T 15/04* (2011.01)
*G06T 5/70* (2024.01)
*G06T 17/20* (2006.01)

(52) U.S. Cl.
CPC ................ *G06T 15/04* (2013.01); *G06T 5/70* (2024.01); *G06T 17/20* (2013.01)

(58) Field of Classification Search
None
See application file for complete search history.

(56) References Cited

U.S. PATENT DOCUMENTS 10,937,237 B1 * 3/2021 Kim ...................... G06T 17/205
12,236,510 B2 * 2/2025 Phan .................... G06V 40/174
2022/0166955 A1 * 5/2022 Gronau .................. G06T 19/20

OTHER PUBLICATIONS

Avrahami et al., "Blended latent diffusion", ACM Trans. Graph., vol. 42, No. 4, 2023, 11 pages.
Bar-Tal et al., "MultiDiffusion: Fusing Diffusion Paths for Controlled Image Generation", arXiv:2302.08113, 2023, 16 pages.
Chen et al., "Fantasia3D: Disentangling Geometry and Appearance for High-quality Text-to-3D Content Creation", In Proceedings of the IEEE/CVF International Conference on Computer Vision (ICCV), Oct. 2023, 11 pages.
Chen et al., "Text2tex: Text-driven texture synthesis via diffusion models", arXiv:2303 v1, 2023, 15 pages.
Gal et al., "Seamless Montage for Texturing Models", Eurographics, vol. 29, No. 2, May 2010, pp. 479-486.
Hardin et al., "A comparison of popular point configurations on S2", Dolomites Research Notes on Approximation, vol. 9, 2016, pp. 16-49.
Hasselgren et al., "Appearance-driven automatic 3d model simplification", In Eurographics Symposium on Rendering, 2021, 19 pages.
Hessel et al., "CLIPScore: a reference-free evaluation metric for image captioning", arXiv:2104.08718, Mar. 2022, 15 pages.

(Continued)

*Primary Examiner* — Saptarshi Mazumder
(74) *Attorney, Agent, or Firm* — ARENTFOX SCHIFF LLP

(57) ABSTRACT

A method of generating textures for a 3D mesh is provided. In the method, the 3D mesh is received. The 3D mesh includes a plurality of vertices and a plurality of faces. The plurality of faces is formed based on the plurality of vertices. A latent texture map is generated based on a plurality of latent images of the 3D mesh in a latent space from a plurality of view angles. The latent texture map is denoised to remove noise based on a diffusion process. The textures are generated for the 3D mesh in a pixel space based on the denoised latent texture map.

20 Claims, 8 Drawing Sheets

(56) References Cited

OTHER PUBLICATIONS

Heusel et al., "GANs Trained by a Two Time-Scale Update Rule Converge to a Local Nash Equilibrium", Neural Information Processing Systems (NIPS), 2018, 38 pages.
Keinert et al., "Spherical fibonacci mapping", ACM Transactions on Graphics, vol. 34, No. 6, 2015.
Maximilian Seitzer. pytorch-fid: FID Score for PyTorch. https://github.com/mseitzer/pytorch-fid, Version 0.3.0, Aug. 2020.
Poole et al., "Dreamfusion: Text-to-3d using 2d diffusion", arXiv, 2022, 18 pages.
Richardson et al., "Texture: Text-guided texturing of 3d shapes", arXiv:2302.01721, 2023, 13 pages.
Rombach et al., "High-resolution image synthesis with latent diffusion models", arXiv:2112.10752, 2022, 45 pages.
Sketchfab, "The best 3d viewer on the web", 2022.
Song et al., "Denoising diffusion implicit models", In International Conference on Learning Representations, 2021, 22 pages.
Zhang et al., "Adding conditional control to text-to-image diffusion models", arXiv:2302.05543, 2023, 12 pages.

* cited by examiner

| | Ours | TEXTure | Text2tex | Gray |
|---|---|---|---|---|
| Median CLIP-Score↑ | 0.299 | 0.294 | 0.275 | 0.233 |
| Mean FID↓ | 25.54 | 32.95 | 46.38 | 136.23 |

| FID↓ | 196px | 128px |
|---|---|---|
| SH 0 | 17.47 | 19.53 |
| SH 1 | 23.31 | 22.78 |

CONSISTENT LATENT DIFFUSION FOR MESH TEXTURING

TECHNICAL FIELD

The present disclosure includes aspects related to generation of textures, including apparatuses and methods of generation of textures for a three-dimensional (3D) mesh based on a consistent latent diffusion.

BACKGROUND

Creation of 3D models can be a difficult task because a trained artist and custom tooling are often required, but the 3D models are common in games, shopping, and other applications. To reduce a burden of creating the 3D models, recent work seeks to leverage two-dimensional (2D) image generation to generate 3D geometries and textures. The work can often be costly to run when both geometries and textures are optimized, which may require multiple GPUs and hours of training. In some applications, meshes may already exist and may be used for generative texturing, without creating a new geometry. Such a strategy may be used for procedural asset generation in games. For example, the strategy may be applied to generate objects, such as furniture, terrain, or non-playable characters, and a burden for artists to create repetitive static content may be reduced. With generative texturing, a diversity of content may be increased without requiring significant computational resources.

SUMMARY

Aspects of the disclosure include methods, apparatuses, and non-transitory computer-readable storage mediums for generation of textures for a three-dimensional (3D) mesh. The textures may be generated based on consistent latent diffusion.

According to an aspect of the disclosure, a method of generating textures for a 3D mesh is provided. In the method, the 3D mesh is received. The 3D mesh includes a plurality of vertices and a plurality of faces. The plurality of faces is formed based on the plurality of vertices. A latent texture map is generated based on a plurality of latent images of the 3D mesh in a latent space from a plurality of view angles. The latent texture map is denoised to remove noise based on a diffusion process. The textures are generated for the 3D mesh in a pixel space based on the denoised latent texture map.

In an example, to generate the latent texture map, the latent texture map is generated based on rendered textures of the 3D mesh in the pixel space for the plurality of view angles. The latent texture map includes latent textures of the 3D mesh and a plurality of independent identically distributed (I. I. D.) Gaussian noises. Each of a plurality of latent pixels in the latent texture map includes a respective latent value. A spherical harmonic coefficient is determined for each of the latent values of the plurality of latent pixels in the latent texture map based on the view angle associated with the respective latent value.

In an example, a selected region of each of the plurality of latent images of the latent texture map includes a same set of the I. I. D. Gaussian noises.

In an example, to determine the spherical harmonic coefficient, a spherical harmonic coefficient is determined for a latent value of a latent pixel of the latent pixels based on the latent value of the latent pixel in the latent texture map and a real Legendre polynomial of a predefined order. For example, the spherical harmonic coefficient for the latent value of the latent pixel is determined as $$SH_{u,v}(\theta, \phi) = \sum_{\ell=0}^{N} \sum_{m=-\ell}^{\ell} SH[u, v] Y_\ell^m(\theta, \phi),$$

where [u, v] is the latent value of the latent pixel of the latent pixels in the latent texture map, $Y_\ell^m$ is the real Legendre polynomial of the predefined order $\ell$, and (θ, ϕ) indicates a view angle of the view angles.

In an example, to denoise the latent texture map, latent textures are rendered into a first latent image of the plurality of latent images of the latent texture map. The first latent image is generated for a first view angle. The latent textures of the first latent image in a selected region of the first latent image are denoised. The selected region is defined by a mask. Updated textures of the first latent image are generated based on the denoised latent textures.

In an example, to generate the updated textures of the first latent image, differences between the denoised latent textures and rendered latent textures are determined by projecting the denoised latent textures onto the rendered latent textures in the first latent image. The updated textures of the first latent image are generated based on the determined differences.

In an example, to denoise the latent texture map, a spherical harmonic coefficient is determined for each of latent values of a plurality of latent pixels in the updated textures of the first latent image with weighted least squares. The latent texture map is denoised based on a least square of weighted updated textures of the first latent image and a weighted view angle of the first view angle. For example, the latent texture map is denoised as $$U_{i+1} = (1-\alpha)Lstsq(wT_{i+1,j}, wV) + \alpha Lstsq_{order0}(wT_{i+1,j}, wV),$$

where $U_{i+1}$ is the denoised latent texture map, α is a factor, w is a weight factor, $T_{i+1,j}$ is the updated textures of the first latent image, and V is the view angle of the first view angle.

In an example, to generate the textures for the 3D mesh, a weighted average texture of the updated textures of the plurality of latent images in the denoised latent texture map is determined. A gradient is determined. The gradient indicates a minimum difference between the weighted average texture and the updated textures of each of the plurality of latent images. The updated textures of the plurality of latent images are optimized based on the determined gradient to generate optimized textures of the plurality of latent images.

In an example, to determine the weighted average texture, the updated textures of the plurality of latent images are decoded into the pixel space to generate a plurality of pixel images. A difference between each pair of shared regions in the plurality of pixel images is determined. The weighted average texture is determined as an average of weighted differences between the pairs of shared regions in the plurality of the pixel images.

In an example, to generate the textures for the 3D mesh, the optimized textures of the plurality of latent images are decoded into the pixel spaces to generate a plurality of RGB images in the pixel space. The plurality of RGB images includes textures. A number of samples in the plurality of RGB images is greater than a number of samples in the plurality of latent images.

In an example, to generate the textures for the 3D mesh, the plurality of RGB images is projected onto the 3D mesh to generate an RGB texture map of the 3D mesh. Differences between the textures of the plurality of RGB images and rendered textures of the 3D mesh are determined. The rendered textures of the 3D mesh are rendered for the plurality of view angles. The textures of the plurality of RGB images in the RGB texture map are updated to generate the textures of the 3D mesh based on the differences between the textures of the plurality of RGB images and the rendered textures of the 3D mesh.

According to another aspect of the disclosure, an apparatus is provided. The apparatus includes processing circuitry. The processing circuitry is configured to perform any one or a combination of the methods for generating textures for a 3D mesh.

Aspects of the disclosure also provide a non-transitory computer-readable medium storing instructions which when executed by at least one processor cause the at least one processor to perform any one or a combination of the methods for generating textures for a 3D mesh based on consistent latent diffusion.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
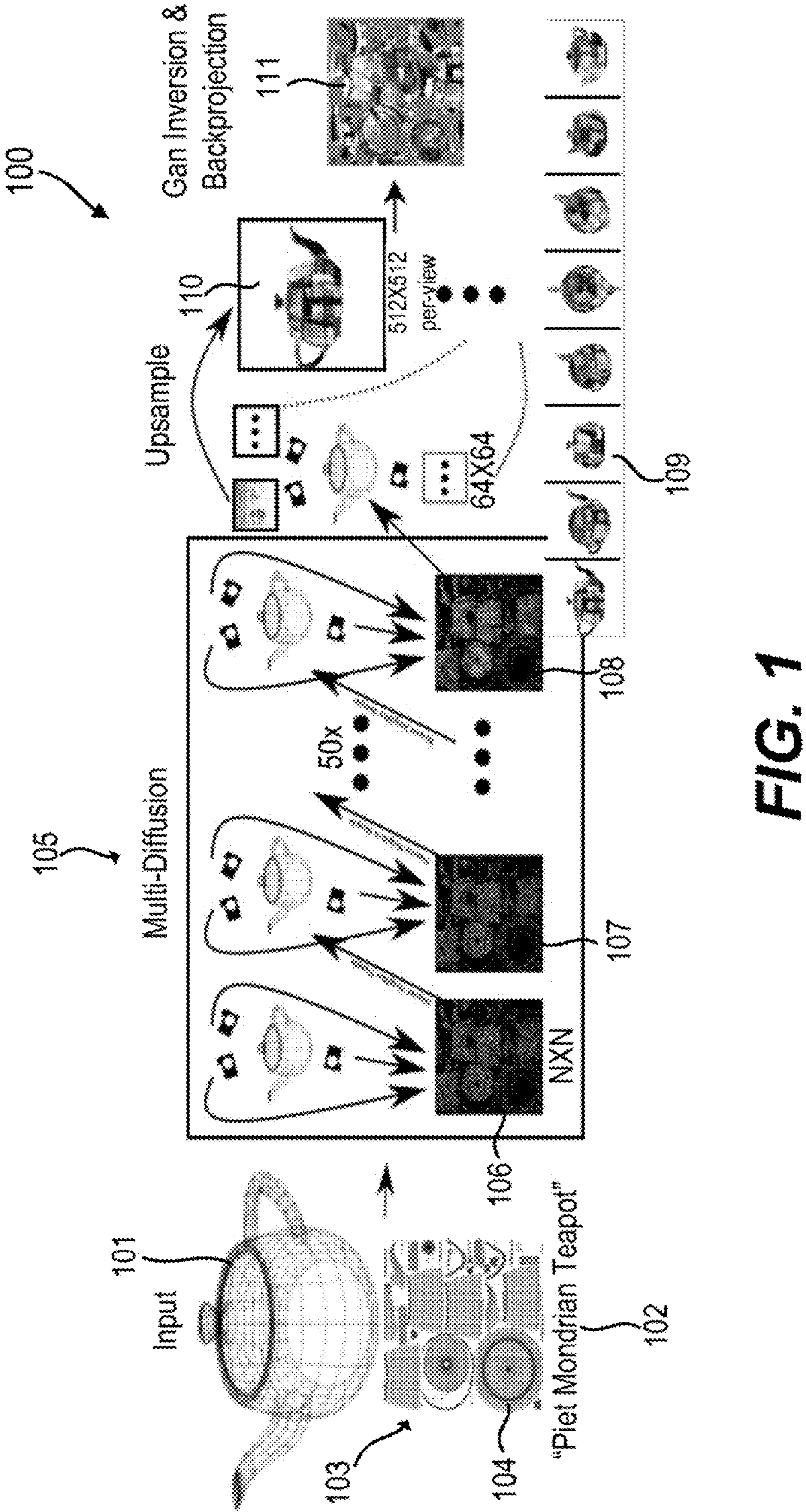
FIG. 1 is a schematic illustration of a muti-diffusion mesh texturing in accordance with some aspects.

Mesh texturing from text may utilize multiple diffusion models and heuristics to stitch together multiple different views of a same mesh. The use of multiple diffusion models and heuristics differs from other related approaches that are not generally applicable to mesh surfaces and operated directly using convolutions on the mesh surface. However, the quality of textures generated using multiple diffusion models and heuristics may be poor for multiple reasons. In an example, the textures may exhibit artifacts along in-painting edges due to a random nature of a diffusion process. In another example, clear shading differences between different views may exist, and texture stretching may exist due to a projection along surfaces which are not flat with respect to the camera. The issues mentioned above may be found in TEXTure and Text2Tex because TEXTure and Text2Tex iteratively backproject and stitch generated images onto the mesh surface, and have little control over the diffusion process.

In the present disclosure, consistent latent diffusion for mesh texturing is provided. The diffusion process may be unified for multiple views, to jointly denoise the multiple views to generate a more consistent texture on the surface of a mesh. Based on MultiDiffusion for panorama generation, for example, multiple diffusion steps may be aggregated into a single image, and then back-projected from each upsampled view to obtain a single consistent output. While MultiDiffusion demonstrates an approach on a single large image for panorama generation, in the present disclosure, a single spherical harmonic latent texture map may be used, to render the mesh in a latent space. By back projecting each view in the latent space, multiple views may be aggregated together from a single diffusion pass. The approach mentioned above may first be applied in 2D, to demonstrate a consistent diffusion, and then processed in 3D for mesh texturing.

MultiDiffusion on a single image may produce a high-quality consistent output by mimicking a single diffusion path from the utilized diffusion model. Unlike the panorama generation by the MultiDiffusion, warping introduced by a texture stretch and a camera angle is considered in the present disclosure. For example, multiple techniques were utilized to mitigate these effects, such as weighing an importance of pixels based on orientations of the pixels towards the camera, and/or by varying a latent texture size per model based on a texel usage of the UV parameterization. In summary, aspects of the consistent latent diffusion provided in the present disclosure may include:

(1) A diffusion approach that allows for pixel-wise similarity in a masked region.

(2) A generalization of MultiDiffusion to texturing 3D surfaces.

(3) A comparison of the consistent latent diffusion to related examples, such as TEXTure and Text2Tex.

In related examples, mesh texturing is applied to generate textures for a 3D mesh. For example, many approaches exist to texture a surface of a mesh, such as PTEX, HTEX, tri-planar mappings, linearly interpolating between per-vertex colors, or UV mapping. In the disclosure, UV mapping may be applied, which may cut a mesh into multiple surfaces homeomorphic to a plane and flatten each of these surfaces into a shared texture space, upon which an image is painted. The texture may be created by an artist using suitable tools, such as Digital Content Creation tools or through an automatic process. During rendering, an image may be resampled onto the surface of the mesh to create a desired appearance. UV mapping may run in real-time and may be suitable for arbitrary mesh topologies. Accordingly, UV mapping is widely used in rendering and games. UV mapping may also be suitable for back projecting textures. For example, UV mapping in related examples may take rendered images and project pixels back onto the original mesh. In the disclosure, UV projections may be applied to obtain a minimal distortion. In an example, xatlas may be applied to produce a UV mapping for a model (or 3D model), unless the model is associated with a sufficient mapping.

In related examples, Text to Image is applied to generate textures for a 3D mesh. For example, tools, such as Stable Diffusion, Imagen, and commercial software (e.g., Midjourney AI), may be applied to generate an image based on text.

Some related examples leverage "diffusion", which takes a noisy image $I+\mathcal{N}(0,V)$, and outputs a new image $I+\mathcal{N}(0,V')$, such that $V'<V$, where $\mathcal{N}(0,1)$ is a normal distribution with a mean 0 and a variance 1. By training a network on large number of images, and in some cases millions of images, conditioned on a text description for each image, a function may be determined that inverts added noise, and produces highly-detailed, realistic images. The tools may match a quality of an artist, and implications of the tools for society are still being explored.

In related examples, Text To 3D may be applied to generate textures to a 3D mesh. Given the explosion of Text-to-Image, tools of Text-to-Image may be leveraged to generate textures for 3D models, and even generate the entire 3D models themselves. In an example of mesh texturing, TEXTure uses Text-to-Image, Inpainting, and Depth-to-Image models to render a mesh from multiple views and heuristics to stitch images from the multiple views together to generate a single texture. For example, the multiple views may inpaint in a checkerboard pattern to increase a consistency of results of the multiple views. TEXTure may require 5 minutes to run, as TEXTure is not an optimization process, in contrast to generative optimization approaches, such as DreamFusion. The DreamFusion may take hours to run, require a cluster of GPUs, and be impractical for artistic use.

In addition, some of the related examples mentioned above may not be peer-reviewed or verified, and a number of commercial tools may not document their process.

In the disclosure, given a 3D mesh with a UV parameterization, approaches (or methods) to generate textures from text prompts is provided. Related examples that use optimization from Text-to-Image Diffusion models to generate textures and geometry may be slow and require significant computational resources. Alternatively, projection-based approaches may use the same Text-to-Image models to paint images onto a mesh, but the projection-based approaches may lack consistency at different viewing angles. In the disclosure, a method (or approach) that uses a single Depth-to-Image diffusion network is provided. The method may generate a single consistent texture. The single consistent texture may be rendered on a 3D surface by first unifying diffusion paths of multiple 2D images and transferring the single consistent texture to 3D. The transfer may be performed with MultiDiffusion, for example. The method of the disclosure was demonstrated on an example dataset containing 30 meshes, taking approximately 5 minutes per mesh. To evaluate quality of the provided method, a CLIP-score and a Frechet Inception Distance (FID) were applied to evaluate the quality of the rendering, and improvement of the provided method was demonstrated over the related work.

FIG. 1 shows an example of a process (100) related to a consistent latent diffusion for mesh texturing. The process (100) may have inputs that include a 3D mesh (101) with UV coordinates and a text prompt (e.g., Pict Mondrain Teapot) (102). In an aspect, the 3D mesh (101) may be rendered from a plurality of view angles, and a pixel texture map (103) may be obtained accordingly. The pixel texture map (103) may include a plurality of pixel images (e.g., (104)) that are rendered from the different view angles. Each of the pixel images may be rendered from a respective view angle and include respective rendered textures. The 3D mesh (101) may be generated in various manners. In an example, the 3D mesh (101) may be rendered manually, such as by an artist. In an example, the 3D mesh (101) may be rendered by a program based on a seed (e.g., latent seed) to generate the rendered textures.

Still referring to FIG. 1, a multi-view multi-diffusion process (105) may be performed on the pixel map (103). For example, the rendered textures of the plurality of pixel images in the pixel texture map (103) may be encoded into a latent texture map (106) that include a plurality of latent images in a latent space by the diffusion process (105). Each of the latent images in the latent texture map (106) may further be denoised by the diffusion process (105). The mesh (101) may then be rendered based on sampled pixels of the latent texture map (106). In an aspect, nearest neighbor sampling may be applied. A latent texture map (107) may be obtained that includes a plurality of latent images. Each of the latent images in the latent texture map (107) may be rendered from a respective view angle and include respective latent textures. Each of the latent images in the latent texture map (107) may be denoised by the diffusion process (105). Further, the mesh (101) may then be rendered based on sampled pixels of the latent texture map (107), and another latent texture map may be obtained that includes a plurality of latent images. The rendering and denoising may be repeated in the diffusion process (150) to a plurality of times, such as 50 times, to obtain a final latent texture map (108) that includes a plurality of latent images. The latent images of the final latent texture map (108) may include latent textures and be rendered from the view angles. For example, as shown in FIG. 1, eight latent images (109) are provided. Each of the eight latent images may be rendered from a respective view angle.

Still referring to FIG. 1, the latent images (109) may be upsampled, such as upsampled from 64×64 pixels to 512×512 pixels. Thus, upsampled latent images (110) may be obtained. Further, Gan Inversion may be performed. The Gan inversion is configured to stitch the latent images (110) together in the latent space. The Gan Inversion may generate a plurality of pixel (or RGB) images based on the latent images (110) and minimize differences between the pixel images to form a pixel texture map (111) in an image space. An example of an algorithm of the Gan Inversion is shown in Table 2. A back projection may be performed to project the pixel images in the pixel texture map (111) onto the 3D mesh (101) and identify differences between textures of the pixel images and the rendered textures, such as the rendered textures in the pixel texture map (104). The textures of the pixel texture map (111) may further be updated based on the identified differences. The 3D mesh (101) may then be rendered based on the updated textures in the pixel texture map (111).

Figure 2:
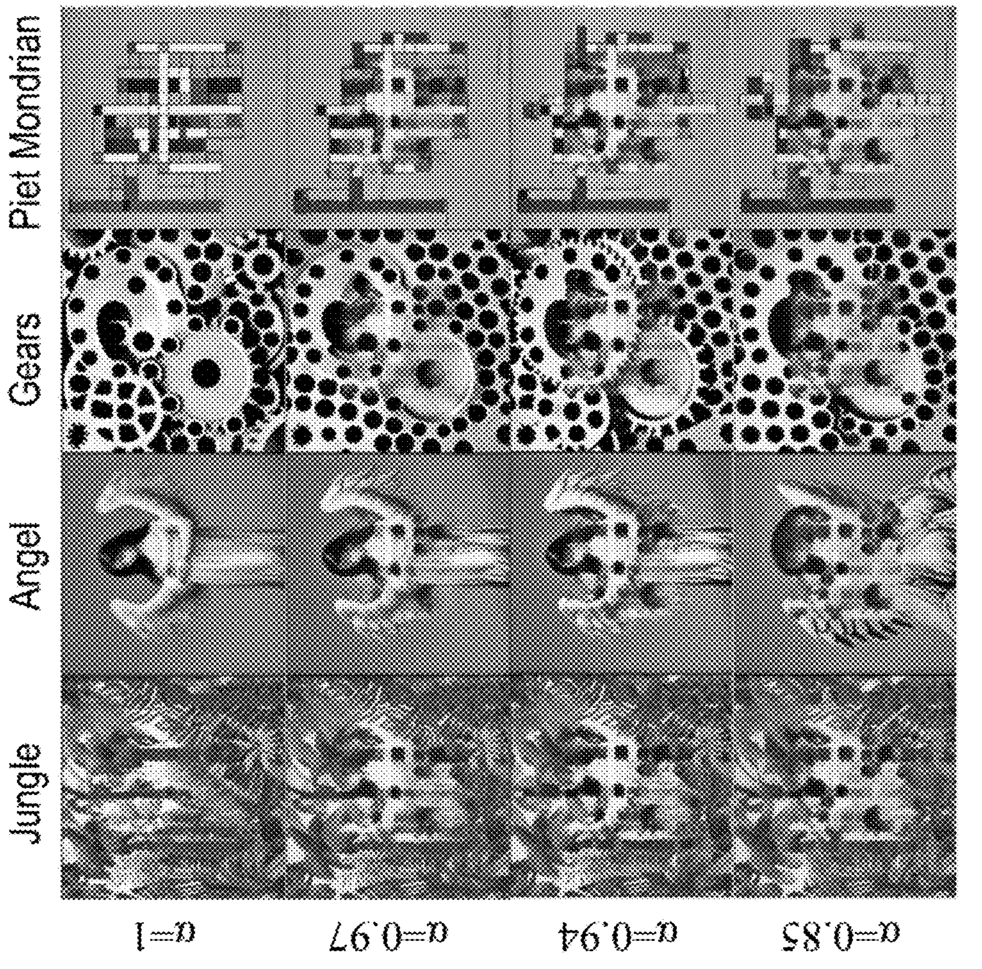
FIG. 2 is a schematic illustration of a consistent latent diffusion in accordance with some aspects.

In the disclosure, consistent diffusion across multiple images with different prompts may be firstly considered before pixel-wise consistent views on 3D meshes are generated. In an aspect of the disclosure, the diffusion process may be modified. In an example, the same shared noise may be added to all images in a latent space and the same shared noise may be ensured to remain consistent through a joint update step. The same shared noise may further be denoised based on an average of all update steps for all images. By uniformly updating all latent-space pixels, all the latent-space pixels may be ensured to cover approximately similar pixel-wise images. Example pseudocode (or Algorithm 1) is outlined in Table 1, and an example output is shown in FIG. 2.

In an aspect of the disclosure, all images may share the same noise because each latent pixel in the images may be represented as $\mu+\delta$, $\mu\in\mathbb{R}$, $\delta\sim\mathcal{N}(0,\sigma)$, where $\mu$ may be a latent value of a pixel, $\delta$ may be a delta from $\mu$, and $\mathcal{N}(0,\sigma)$ may be a normal distribution with a mean 0 and a variance $\sigma$. An average of two latent-space pixels, such as $$\frac{1}{2}(\mu_0+\mu_1+\delta_0+\delta_1),$$

may break an assumption that $\mu+\delta$ is drawn from a distribution with variance $\sigma$. In a case that $\delta_0=\delta_1$, the average may be simplified as $$\frac{1}{2}(\mu_0+\mu_1)+\delta,$$

which may be considered as a sample from $\sim\mathcal{N}(\frac{1}{2}(\mu_0+\mu_1), \sigma)$. Thus, the variance assumed by the diffusion model may be preserved.

Table 1 shows an example of pseudocode (or Algorithm 1) of a consistent latent diffusion process.

TABLE 1

| An exemplary pseudocode of consistent latent diffusion |
|---|
| Algorithm 1 Consistent Latent Diffusion |
| Input: N prompts, mask m, Diffusion D, $\alpha \in [0,1]$ |
| Output: N images I s.t. $\forall i, j: I_i[m] \approx I_j[m]$ |
| $I_0$ = I.I.D. Gaussian Noise $\in \mathbb{R}^{N\times512\times512}$ |
| $S_{ident}$ = I.I.D. Gaussian Noise $\in \mathbb{R}^{1\times64\times64}$ |
| $S_{indep}$ = I.I.D. Gaussian Noise $\in \mathbb{R}^{N\times64\times64}$ |
| ▷ Share noise in masked region: |
| 1: $U_0 = \text{encode}(I_0) + \text{where}(m, S_{ident}, S_{indep})$ |
| 2: for $i \in [0, \text{steps}]$ do ▷ Diffusion |
| 3: $U'_{i+1} \in \mathbb{R}^{N\times64\times64} = D(U_i)$ |
| 4: $\overline{U}_{i+1} \in \mathbb{R}^{1\times64\times64} = \frac{1}{N}\sum U'_{i+1}$ |
| ▷ Within mask, lerp avg. and per image update: |
| 5: $U_{i+1} = \text{where}(m, \alpha U'_{i+1} + (1-\alpha)\overline{U}_{i+1}, U'_{i+1})$ |
| 6: end for |
| 7: return decode $(U_{steps})$ ▷ Decode final image |

As shown in Table 1, inputs may include N prompts, a mask m to determine a selected region in an image, a diffusion process D (e.g., stable diffusion), and a parameter $\alpha \in [0, 1]$. Outputs may include N images I that correspond to the N prompts. Each image I may correspond to a respective prompt. Further, a selected region defined by the mask m may be similar in each image (e.g., $\forall i, j: I_i[m] \approx I_j[m]$). In the consistent latent diffusion process, N UV parameterized texture image(s) $I_0$ in an image space (or pixel space) matching the N prompts may be generated, such as by a rendering process. The texture image $I_0$ may include independent identically distribution (I. I. D.) Gaussian Noise. Identical noise $S_{ident}$ may be defined in the selected region for each texture image. Independent noise $S_{indep}$ may be defined in a non-selected region for each texture image.

Still referring to Table 1, at line 1, an initial latent image $U_0$ that corresponds to a texture image $I_0$ may be formed based on an encoding process. For example, the texture image $I_0$ may be encoded in a latent space, where the identical noise $S_{ident}$ may be defined in the selected region of the mask m, and independent noise $S_{indep}$ may be defined in a non-selected region. At line 2, a diffusion process that includes a plurality of iteration steps may be performed. At line 3, a latent image $$U'_{i+1}$$

may be obtained by performing the diffusion process to denoise a previous latent image. For example, if i=0, the $$U'_1$$

may be obtained by performing the diffusion process to denoise the initial latent image $U_0$. If i=1, the $$U'_2$$

may be obtained by performing the diffusion process to denoise the first latent image $U_1$. At line 4, an average latent image $\overline{U}_{i+1}$ of N latent images may be obtained. Each of the N latent images corresponds to a respective one of the N prompts. For example, as shown in FIG. 2, the N prompts may include jungle, angle, gears, and Piet Mondrian. Thus, an average latent image $\overline{U}_{i+1}$ of 4 latent images corresponding to the 4 prompts may be obtained. At line 5, within the mask region of each latent image, a lerp average may be applied to obtain an updated latent image $U_{i+1}$, where in the mask region, latent pixels may be updated as $$\alpha U'_{i+1} + (1-\alpha)\overline{U}_{i+1},$$

and in the non-masked region, the latent pixels may be updated as $$U'_{i+1}.$$

Once the plurality of iteration steps, such as 50 times, is completed, at line 7, a final latent image $U_{steps}$ may be decoded to generate a pixel image in the pixel space. For example, four pixel images are generated in FIG. 2 correspond to the 4 prompts.

When all diffusion paths are forced to match exactly, low-quality outputs may be generated because the exact match requirement may overly constrain the diffusion process. Therefore, in the disclosure, some freedom may be provided to each diffusion path by introducing a parameter $\alpha \in [0, 1]$, which may allow more coherent outputs at a cost of exact equality. A diffusion process, such as Stable Diffusion 2.1, was tested by introducing the parameter $\alpha$. The parameter $\alpha$ was observed to produce a coherent and consistent output across multiple prompts, which may be show in FIG. 2. As shown in FIG. 2, an example of consistent latent diffusion is provided. In the consistent latent diffusion, 4 prompts may be applied, such as jungle, angle, gears, and Piet Mondrain. Each prompt may correspond to an image. Diffusion paths may be kept consistent in a center crop (or center region) of each image while an original quality may be kept. As a goes from 1 to 0, consistency increases, but a similarity among the 4 images degrades. For example, when $\alpha=1$, the similarity among the 4 images degrades the most. In an example of FIG. 2, a denoising diffusion implicit model (DDIM) sampler with 100 steps was applied.

An untextured triangle mesh M, such as the 3D mesh (101) with a UV parameterization $\varphi$ that maps each face to a 2D plane, a text prompt describing what the textured object should look like, a set of cameras, and a pretrained diffusion model may be used to transfer the consistent diffusion process to 3D. The mesh M may be defined as $M \triangleq (V,F)$, $V \subset \mathbb{R}^3$, $F \subset V^3$. In an aspect, the set of cameras may correspond to a plurality of view angles. The set of cameras may be virtual cameras. In an aspect, the pretrained diffusion model may be Stable Diffusion 2.1 with a depth. In an example, the pretrained diffusion model may be Control Net that is also applied by Text2Tex. In an example, the pretrained diffusion model may correspond to any other suitable text to image approaches. A final output may be a texture map such that a textured model from a fixed view may correspond to a single-image output of the pretrained diffusion model.

To generate a consistent texture, an intermediate multi-diffusion step may optimize a latent-space texture map given a set of views. In an example, based on MultiDiffusion, an existing Diffusion Model, $D(I,T) \rightarrow 1$, may be applied, where I is an image in $\mathbb{R}^{H \times W \times C}$, and T is a text prompt. The diffusion process iteratively optimizes an image $I_0 \ldots I_n$, where each pixel in $I_0$ is assumed to be I.I.D. and sampled from the Gaussian distribution. Analogous to MultiDiffusion, another diffusion process, $D'(U,T) \rightarrow U$, may be defined, where U may be a texture map for a UV unwrapped mesh. D' may follow the original diffusion process D, and intend to minimize a loss $\mathcal{L}_{Render}$ according to equation (1) as follows:

$$\mathcal{L}_{Render} = \sum_{v \in V} \| W_v \otimes (R(v, U, M) - D(I|T, v)) \|_2 \qquad \text{Eq. (1)}$$

Where R(v,U,M) is rasterization using nearest-neighbor sampling from a view (or view angle) v, given the latent texture map U, mesh M, and per-pixel weights $W_v$. By optimizing the rendered mesh with a same texture map across all views, the diffusion of all views may be merged. Spherical harmonics may be introduced to control a level of independence from other views. By minimizing the loss $\mathcal{L}_{Render}$, a texture may be produced that is consistent with the original diffusion model from the view v. Note that the texture map may not be denoised directly, as the UV parameterization may have discontinuities and may be warped compared to the rendered image. To convert the final latent texture to actual rendered images, the latent space of each camera view may be converted to an image space, and then the texture may be updated using differentiable rendering or other approaches.

In the disclosure, a spherical harmonic latent texture map may be applied. In contrast to 2D consistent diffusion, mesh diffusion may use a single latent texture map. Since each pixel may only have a single view, each view may be fully correlated with other views, which is similar to setting $\alpha=0$ in consistent 2D diffusion. As mentioned above, when all views are correlated, quality of the output may be reduced. To provide each view with some degrees of freedom, instead of storing a single latent value, spherical harmonic coefficients (or SH) may be stored. The SH may be defined as $SH(\theta,\phi)=1+N(0,\sigma)$, where $\theta$ and $\phi$ are view directions from a camera. The spherical harmonics (or spherical harmonic coefficients) may further be defined in equation (2) as follows:

$$SH_{u,v}(\theta, \phi) = \sum_{\ell=0}^{N} \sum_{m=-\ell}^{\ell} SH[u, v] Y_\ell^m(\theta, \phi), \qquad \text{Eq. (2)}$$

where [u, v] is an index into texture SH containing coefficients (SH[u,v] indicates a latent value of a pixel in the latent space) and $Y_\ell^m$ is a real Legendre polynomial of an order $\ell$. The spherical harmonic coefficients may allow each view to be independent from other views. Spherical harmonics may separate latent values of each view, allowing for a higher quality per view image. In an example, analogous to consistent latent diffusion in Table 1, a parameter $\alpha \in [0,1]$ may be applied to modulate view-independence and correlation.

To compute spherical harmonic coefficients for each denoising step, a least-squares solution of the spherical harmonic coefficients may be computed. The least-squares solution may minimize a $\ell_2$ difference (or least square difference) with a denoised result of each view. The least-square solution may incur no noticeable cost compared to MultiDiffusion. In an aspect, each view may be initialized as random gaussian noise, the least-square solution may be determined according to equation (2). Conceptually, extending constant values (e.g., latent values) to spherical harmonics (or spherical harmonic coefficients) is a generalization of MultiDiffusion, which is analogous to switching from a constant BSDF to a view-dependent BSDF. In an example of the disclosure, the spherical harmonics may have an order 0 which is a constant or have an order 1 which varies linearly with a view direction, and a fixed $\alpha$, such as $\alpha=0.9$.

As mentioned in FIG. 1, GAN inversion may be applied for consistency. It is noted that, even though each view uses a same latent texture map, the views may not have consistent RGB pixel values when the views are decoded. For example, a VAE decoder in Stable Diffusion may not be pixelwise-independent because the VAE decoder incorporates global information during decoding. Thus, the VAE decoder may generate inconsistent RGB pixel values. In addition, from different views, texels may change local neighborhoods and the inconsistency in RGB (or RGB pixel values) may increase. The inconsistent RGB pixel may indicate a decoding error. The decoding error may not be ignored and may lead to blurring if each view is mixed during back projection in RGB. In related examples, such as TEXTure, a "one-hot" approach is applied to avoid blurring because each texel is painted from one view. However, the "one-hot" approach may lead to inconsistencies and seams along views. In the disclosure, to mitigate inconsistent VAE decoding, blending may be applied in a latent space. Similar to blended latent diffusion, GAN inversion may be mimicked in the latent space of the diffusion model. A latent image of each view may be separated, and a RGB difference of each view may be minimized when the view is back projected to all other views. An example of GAN inversion is outlined in algorithm 2, as shown in Table 2, where stopping criteria is a fixed number of steps (or iteration steps).

Table 2 shows an example of a pseudocode of GAN inversion. Inputs of the GAN inversion may include latent images Z from all views, UV (e.g., UV coordinates of a mesh), a mask M that defines a selected region in the view, and a weighting factor W. An output of the GAN inversion may be optimized latent images L' of all views.

TABLE 2

| An exemplary pseudocode of GAN inversion |
| --- |
| Algorithm 2 GAN Inversion Consistency |
| Input: Per View Latents L, UV, Mask M, Weight W<br>Output: Optimized Per View Latents L'<br>1: for i ∈ [0, steps] do |

TABLE 2-continued

An exemplary pseudocode of GAN inversion

```
▷Compute weighted average texture of all current views.
2:    L̄ = (1/N) Σ_{i=0}^{N} W_i backproject(decode(L_i))
3:    for l ∈ L do
▷For each view, backprop ℓ1 difference with avg.
4:        backprop(ℓ1 (backproject(decode(l)), L̄))
5:    end for
6:    L = L + η ∇ L        ▷Optim. step
7: end for
8: return L
```

As shown in Table 2, at line 2, a weighted average texture of all current views (or latent images of all views) may be computed. For example, at a step i, the latent images L may be decoded into pixel images in the pixel space (or RGB space). The pixel images may further be back projected to the 3D mesh, and a difference between shared regions of a pair of views may be determined. Each difference may be weighted by the weighting factor W. The weighted difference may further be averaged to obtain the weighted average texture. At line 4, for each latent image l corresponding to a respective view, the latent image l may be decoded into a pixel image (e.g., decode(l)), and then a difference between the pixel image and the weighted average texture may be determined based on the back projection, such as (backproject(decode(l)),$\bar{L}$). Further, the absolute value of the difference may be defined by $\ell_1$(backproject(decode(l)),$\bar{L}$), where $\ell_1$ indicates an absolute function. A gradient estimation may be performed based on a back propagation operation, such as backprop( ), to determine a gradient that indicates a direction to minimize the difference between the pixel image and the weighted average texture. At line 6, the latent images L may be updated as $L=L+\eta\nabla L$, where $\eta$ is a factor and $\nabla L$ is the gradient determined by the backpropagation operation. $\nabla L$ indicates the direction towards the $\bar{L}$ to minimize the difference between the latent images L.

While the objective of the GAN inversion may be the same as back projection in an image space, the GAN inversion has a different optimization trajectory, because the back projection is performed on a latent manifold. Performing a same optimization in a RGB space may blend semantically-meaningless RGB values, which may lead to blurring. GAN inversion was found to be better at mitigating small tone differences, texture shifts, and other differences caused by decoding. By traversing a latent space to fix RGB inconsistencies, artifacts may be reduced.

Based on spherical harmonic latent texture maps according to equation (2), the GAN inversion defined in Table 2, and multi-view multi diffusion, a pipeline of the consistent latent diffusion for mesh texturing may be implemented using algorithm 3, for example, in Table 3 as follows.

TABLE 3

An exemplary pseudocode of consistent latent diffusion for mesh texturing
Algorithm 3 Mesh Texture Multi-Diffusion

```
Input: Mesh M with UV, views V, Diffusion D
Output: Texture Map U_out
 ▷Compute initial 0^th Order SH texture map
U_0 = i.i.d Gaussian Noise ∈ ℝ^{N×N}
1: for i ∈ [0, steps] do                 ▷Multi-View Multi-Diffusion
2:    for v ∈ V do
3:       I' = D(Render(v, U_i, M))        ▷Denoise
4:       T_{i+1,j} = backproject(I', v, M)
5:    end for
   ▷Compute SH w/ Weighted Least Squares
6:    w = V._weight                      ▷Per pixel weight in each view
7:    U_{i+1} = (1 − α)Lstsq(wT_{i+1,j}, wV) + αLstsq_order0(wT_{i+1,j}, wV)
8: end for
9: U_opt = GAN-Inv(U_last, M.uv, V.mask, V.weight)
10: I_RGB = Decode(Render(V, U_opt, M))  ▷Upsample
11: U_out = DiffRender(V, I_RGB, M))      ▷Backproject
12: return U_out
```

As shown in Table 3, inputs of the consistent latent diffusion may include a mesh M with UV (or UV coordinates), views V including a plurality of view angles, and a diffusion model D (e.g., stable diffusion model). Outputs of the consistent latent diffusion may include a texture Map $U_{out}$ of the mesh M. The consistent latent diffusion may start with forming a latent texture map $U_0$ (e.g., (106) in FIG. 1) based on rendered textures of the 3D mesh. The latent texture map $U_0$ may include latent textures of the 3D mesh and a plurality of I. I. D. Gaussian noises, where each of a plurality of latent pixels in the latent texture map includes a respective latent value. According to equation (2), a spherical harmonic coefficient may be determined for each of the latent values of the plurality of latent pixels in the latent texture map based on the view angle associated with the respective latent value. At line 2, when i=0, for a latent image corresponding to a view v, according to Render(v,$U_i$, M), latent textures may be rendered into the latent image of the latent texture map $U_0$. Further, the rendered latent textures in the latent image may be denoised in a selected region defined by the mask M based on the diffusion model D. Accordingly, denoised latent image I' may be obtained. At line 4, the denoised latent image I' may further be updated based on backproject (I',v,M). For example, the denoised latent image may be back projected onto the rendered latent image, and a difference between the denoised latent image and the rendered latent image may be determined. The denoised latent image I' may be updated based on the difference to form the updated latent image $T_{i+1,j}$. At line 6, in each view v, a weighting factor $w=V_{.weight}$ may be determined. At line 7, the latent texture map $U_0$ may be updated as an updated latent texture map (or denoised latent texture map) $U_{i+1}$, such as the latent texture map (107). The updated latent texture map (or denoised latent texture map) $U_{i+1}$ may be defined as $U_{i+1}=(1-\alpha)Lstsq(wT_{i+1,j},wV)+\alpha Lstsq_{order0}(wT_{i+1,j},wV)$.

Still referring to Table 3, after a number of iterations of denoising defined by the number of steps, a final latent texture map $U_{last}$, such as the latent texture map (108), may be obtained. At line 9, GAN inversion may be performed on the latent images of the final latent texture map $U_{last}$ to improve the consistency of the latent images in the final latent texture map $U_{last}$. Accordingly, an optimized latent texture map $U_{opt}$ may be obtained based on the GAN inversion. In an example, the GAN inversion may be performed based on the algorithm 2 in Table 2. For example, as shown in Table 2, a weighted average texture of textures of the latent images in the final latent texture map may be determined. A gradient that indicates a minimum difference between the weighted average texture and the textures of each of the latent images in the final latent texture map may be determined. The textures of the latent images may be updated based on the determined gradient to generate the optimized latent texture map $U_{opt}$. At line 10, latent images of the optimized latent texture map $U_{opt}$ may be decoded into the pixel space to generate a plurality of RGB images in the pixel spaces. The plurality of RGB images includes textures that are upsampled such that a number of samples in the plurality of RGB images is greater than a number of samples in the plurality of latent images of the optimized latent texture map. At line 11, a differentiable rendering (or DiffRender( )) may be performed. For example, the plurality of RGB images may be projected onto the 3D mesh to generate an RGB texture map of the 3D mesh. Differences between textures of the plurality of RGB images and the rendered textures (e.g., the rendered textures in pixel texture map (103)) of the 3D mesh may be determined. The textures of the plurality of RGB images in the RGB texture map may be updated to generate the textures of the 3D mesh based on the differences between the textures of the plurality of RGB images and the rendered textures of the 3D mesh. For example, as shown in FIG. 1, textures of the pixel texture map (111) may be applied to render the 3D mesh (101).

In an aspect, warping due to projection may be mitigated. In an example, the warping is mitigated by weighing normals. Due to camera projections, significant texture map warping may exist during rasterization. Texels may change neighbors depending on a rendering angle, which may violate one or more assumptions made during the diffusion process. In latent-space denoising, the texture map warping may lead to a number of artifacts because the decoding step may not guarantee independence between pixels. Accordingly, optimization of a single pixel may lead to a different upscaled region when the mesh is rotated, which may lead to poor joint diffusion. In an aspect, GAN inversion is used to mitigate the warping. In addition, the warping may be mitigated by weighting an importance of each pixel. The importance of each pixel may be weighted by a cosine similarity of a normal of a projected face and a viewing direction of a camera. The mitigation of the warping may ensure that a surface which is flat with respect to a camera may be prioritized. The weighting of the importance of each pixel may be used during multi-diffusion, GAN-Inversion, and back projection. The weighting may be necessary during back projection, as some views may have warping artifacts, and the weighting may help keep sharper features.

In an aspect, inconsistency may be reduced through increased guidance. In an aspect, some prompts may not sufficiently express a desired visual image. For example, a prompt "Earth", has artistic interpretations and photographic visuals for "Earth". Such an ambiguity may lead to a significant degradation during multi-diffusion, as multiple interpretations may not be easily stitched, leading to inconsistencies, blurring, and/or gray outputs. While the ambiguity may be mitigated with prompt tuning or textual inversion, a guidance scale during diffusion may lead to a consistent output, at the cost of saturating colors. Thus, in an example, a choice of guidance scale may be ablated for some meshes and/or prompts. In addition, prompt modifiers, such as "back", "front", and "side", may be included based on the camera angle, similar to DreamFusion, to produce a better output.

In an aspect, latent texture sizes may be selected. With an arbitrary UV mapping, a specific set of views may not use enough texels to accurately recover a texture. When insufficient texels are used, a latent texture may not have enough freedom to represent a smooth texture on a surface of a mesh. On the other hand, with too many pixels, each view may be independent from all other views. Thus, an appropriate texture size may need to be selected to maintain a consistency with a good quality. In an example, a latent texture size of 128×128 or 196×196 may be a default selection.

In an aspect, camera parameters may be selected. In an example, cameras may be sampled uniformly on a sphere using a sampling, such as using Fibonacci sampling. For meshes which are not viewed from below, an upper hemisphere may be sampled, which is operated by using an absolute value of a y-coordinate of each original sample. In an example, 8 views based on 8 cameras may provide a high-quality output with sufficient consistency. However, too many cameras may lead to poor results. In an example, cameras may be fixed to a plane, such as XZ plane, which may mitigate projection warping of an elevated camera.

In another aspect, orthographic cameras may be applied. Although perspective cameras are commonly applied because the perspective cameras look plausible to a human eye, the perspective cameras may introduce distortion by stretching distant objects. By using an orthographic camera, flat surfaces may remain unstretched regardless of distances.

Figure 3:
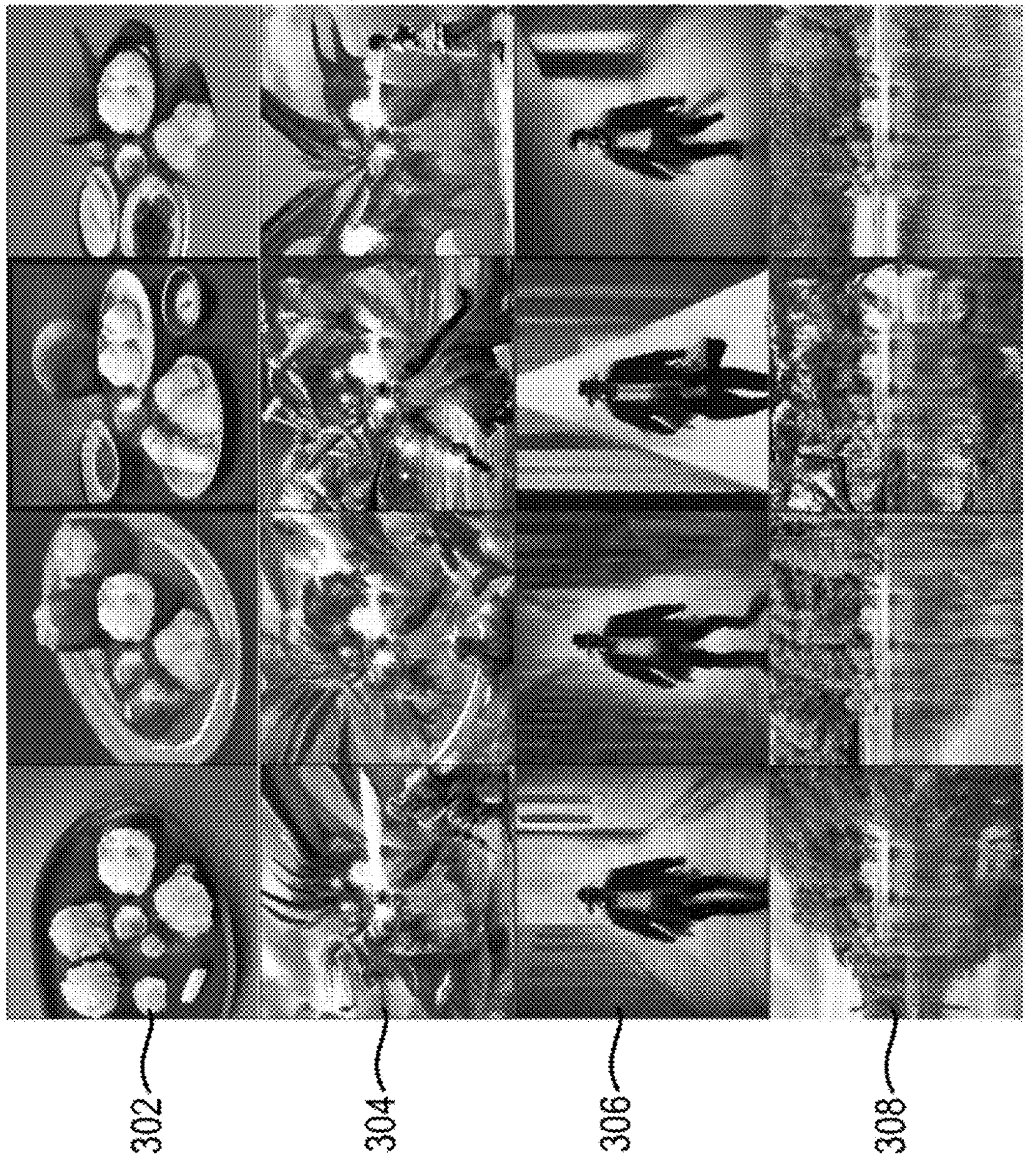
FIG. 3 is a schematic illustration of a consistent two-dimensional (2D) diffusion on a same text prompt in accordance with some aspects.

Various experiments were conducted based on the provided consistent latent diffusion for mesh texturing. In an aspect, consistent 2D diffusion is applied. As shown in FIG. 3, example results of consistent image diffusion may be obtained based on a same text prompt, a unified a center of 128 to 384 pixels, a fixed $\alpha$ as 0.97, and 50 samples steps from DDIM sampler. The prompts from a top to a bottom are (302) "Dim sum still life", (304) "Final Fantasy fighting a dragon", (306) "A detective from an Edward Hopper painting running into a dark alley", and (308) "Ghibli-style bamboo by a lake". The example results in FIG. 3 may reproduce motifs across images. For example, in the produced (302) "Dim Sum Still Life" images, a center crop contains similar pork buns and dumplings, but the rest of the image is different.

In an aspect, consistent mesh diffusion is applied. Example results of the disclosure may be demonstrated based on multiple meshes with a variety of prompts, and qualitatively compared to TEXTure. The experiments were set up by using a single NVIDIA GeForce RTX 3090, with a 32 core AMD processor. In an example, each model takes about 5 minutes to process. For the diffusion model, a Depth2Image Pipeline of Stable-Diffusion 2 from Huggingface was applied. A variety of prompts that are related to a shape of an original input mesh were applied.

The dataset in the experiments included manually collected meshes from Sketchfab and 1-4 prompts related to each input mesh. For example, for a crow mesh, prompts "parrot", "pigeon", and "crow" were applied. In total, 34 unique meshes, with 76 total prompts were included in the dataset. A weight of a forward-facing view during the diffusion process was increased for some meshes, as the forward-facing view was the most salient view.

Quantitative comparisons of the present disclosure against TEXTure and Text2Tex were conducted. For example, Frechet Inception Distance (FID) was applied to evaluate fidelity and similarity to the original diffusion model and CLIP-Score was applied to evaluate a similarity to a prompt.

Figure 4:
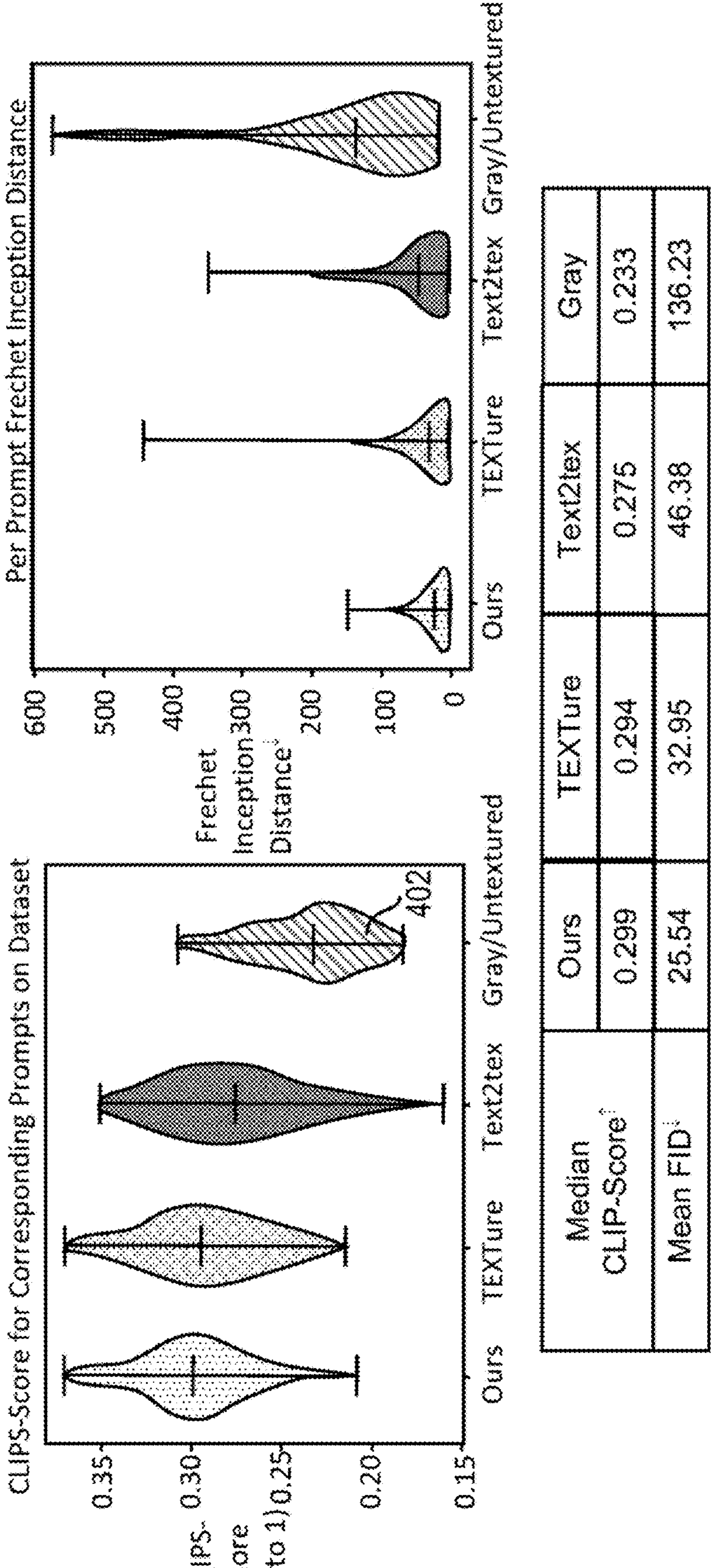
FIG. 4 shows examples of CLIP-score comparisons between a model of the present disclosure and related models.

FIG. 4 shows CLIP-Score comparisons of approaches according to aspects of the present disclosure against other approaches. A CLIP-Score was evaluated on a number of views of a textured mesh against a prompt used to generate an input. CLIP-Scores range from −1 to 1, where 1 is most similar and −1 is least. The approaches according to the aspects of the present disclosure are comparable to TEXTure in CLIP-Score, and better in Frechet Inception Distance, which may be used to measure a distance from Stable Diffusion applied independently to each view.

As shown in FIG. 4, illustrated by a baseline (e.g., Gray/untextured) (402), a mesh itself provides cues that make the mesh similar to a prompt, but adding a texture may improve a correlation with the prompt. On the CLIP-Score, aspects of the present disclosure (e.g., Ours) are comparable to TEXTure, whereas Text2tex does not perform as well consistently. Distributions between TEXTure and the aspects of the present disclosure are similar, which may indicate that certain meshes and prompts are more challenging than others.

To evaluate fidelity, stable diffusion is applied on 8 views independently, and a Frechet Inception Distance is computed with 24 renderings of each retextured model. The present disclosure shows a much tighter distribution than TEXTure and Text2Tex, and a lower mean, which indicates that aspects of the present disclosure outperforms TEXTure and Text2Tex.

Figure 5:
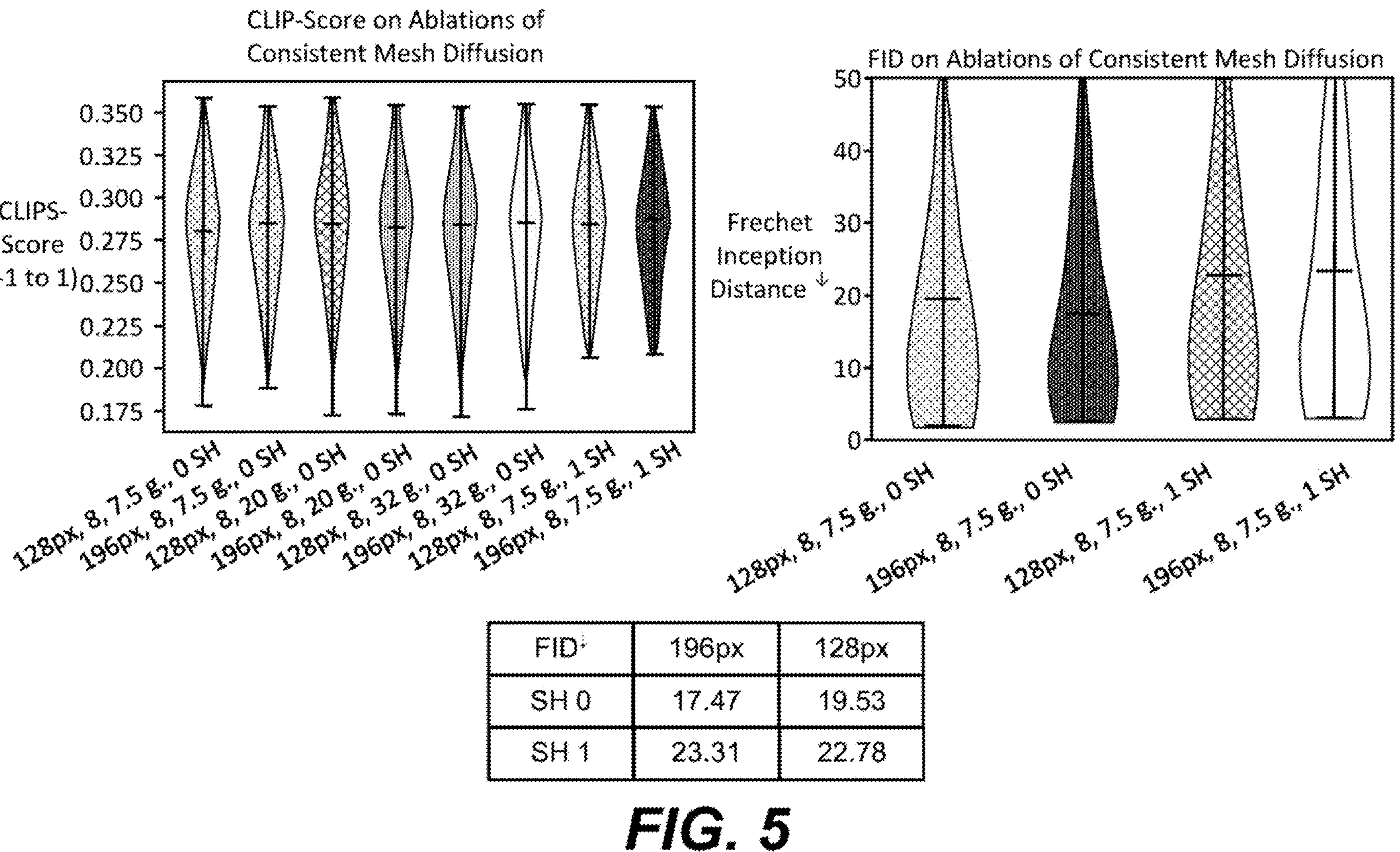
FIG. 5 shows examples of CLP-scores of a model of the present disclosure when ablation is applied.

An example of ablation of the present disclosure with different hyper-parameters is shown in FIG. 5. FIG. 5 shows ablation of the present disclosure by using CLIP-Score as a metric. Two latent texture sizes, 128 and 196 pixels, are evaluated with 8 camera views, and 3 different guidance scales 7.5, 20, and 32. As shown in FIG. 5, use of spherical harmonics of order 1 may increase the consistency of results, but other parameters may be best specified per mesh. In FIG. 5, Frechet Inception Distance was also illustrated for different spherical harmonic orders and different texture sizes. It is noted that, on average, SH 0 has a lower FID than SH1, but a texel size may not have a clear trend across different spherical harmonic orders.

Still referring to FIG. 5, in an example, choices of a latent texture-size, a number of cameras, and a guidance scale were evaluated. It is noted that a consistent pattern may not exist to determine which hyper-parameters are better or worse, and it may be better to evaluate the hyper-parameters per mesh. Regarding the comparison of the datasets mentioned above, a max (or outlier) of the results may be taken over (or taken away) that is based on 8 cameras, 7.5 guidance scale, and a varying texel size is applied to each mesh. It may be important to select a different texel size for each mesh. It is noted that, over all the datasets, an even larger improvement of 0.305 may be obtained when the max is taken out.

Figure 6:
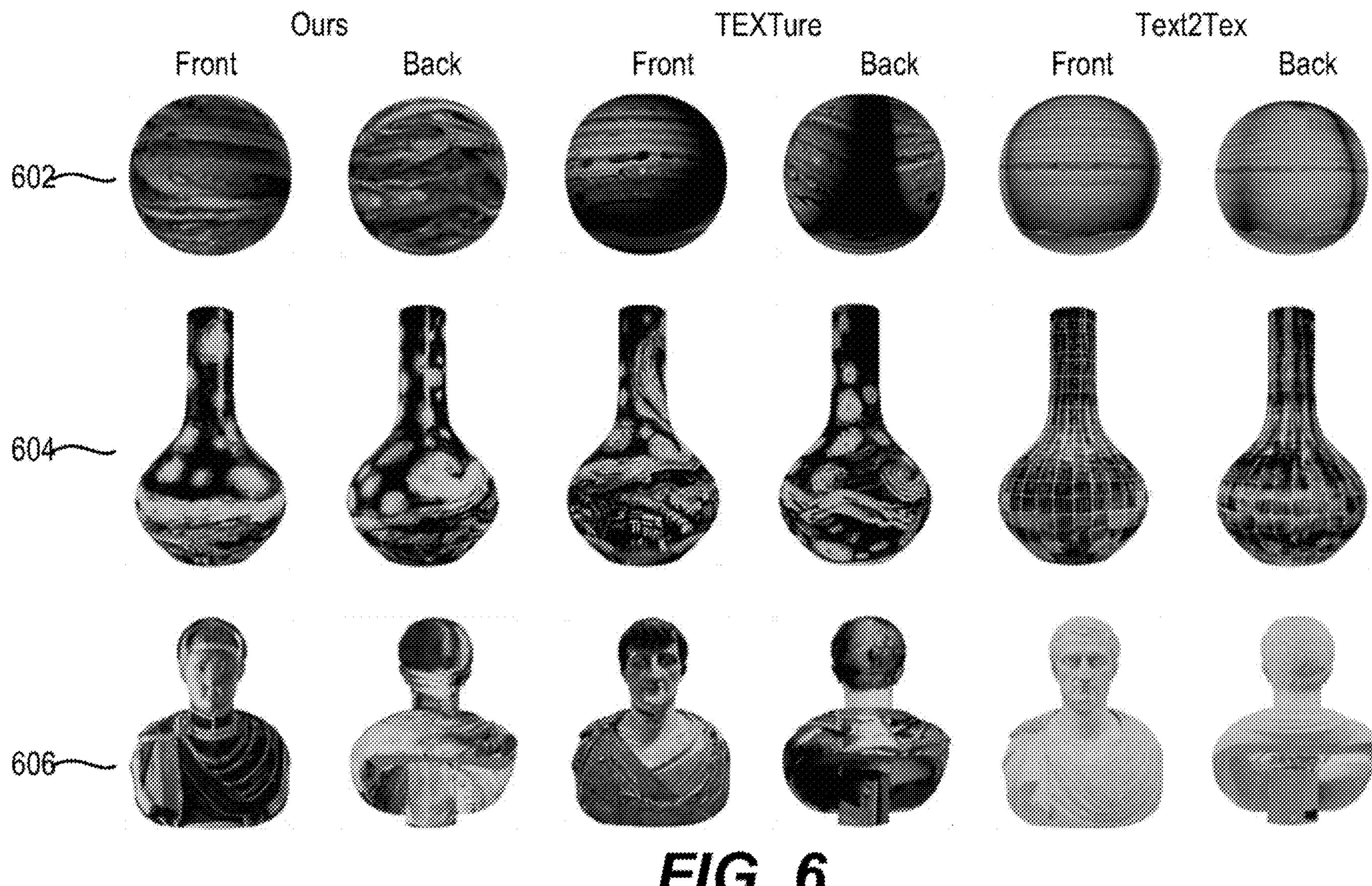
FIG. 6 shows examples of comparisons on various prompts between a model of the present disclosure and related models.

Aspects of the present disclosure were also compared to TEXTure on a number of meshes in FIG. 6. FIG. 6 shows comparisons of the aspects of the present disclosure (e.g., Ours) to TEXTure and Text2Tex using non-cherry-picked examples on prompts (602) “Jupiter”, (604) “Starry Night Van Gogh Vase”, and (606) “Napoleon”. As shown in FIG. 6, aspects of the present disclosure may reduce the number of noticeable seams between different views that were used during generation. Aspects of the present disclosure may also have more consistent lighting since a single diffusion process may be utilized and may reduce stretching on the produced texture. In each image of FIG. 6, both a front view and a back view of the mesh are illustrated. It is noted that quality of each view may vary significantly depending on a random seed. In the experiments shown in FIG. 6, a seed may be fixed for all the approaches.

Still referring to FIG. 6, official TEXTure and Text2Tex codebases were applied to perform the comparisons. It is noted that that implementations of TEXTure may suffer from salt-and-pepper noise due to a backprojection approach of the TEXTure and may not completely fill visible regions with texture. For example, on a sphere textured with “jupiter”, a patch that is untextured may directly be visible from a front view. Text2Tex may also produces noticeable seams between different textured regions. Aspects of the present disclosure may blend all views. Accordingly, results of the aspects of the present disclosure may have smoother transitions between views. In an aspect, it may be possible to create a geometry with untextured regions for all works (or meshes) shown in FIG. 6. However, for TEXTure, even a simple input, such as a sphere, may have untextured regions. It is noted that, while some aspects of the present disclosure and TEXTure use Stable Diffusion 2.1 with Depth, Text2Tex utilizes Control Net with Depth, which may partially explain the difference in the results shown in FIG. 6.

Still referring to FIG. 6, for the “Starry Night Van Gogh Vase”, the result of aspects of the present disclosure and the result of TEXTure may both be good. However, it is noted that significant warping exists at a bottom of the vase in the front view of TEXTure, whereas more natural curves around the bottom appear in the result according to aspects of the present disclosure. FIG. 6 shows that Text2Tex may be sensitive to sharp normal changes, and thus may produce a number of artifacts on the vase, such as edges between mesh faces, and may not match the prompt closely.

For the Napoleon model, the front view of TEXTure does not look good, as the front view is a single muted color. The back view of the present disclosure and TEXTure both exhibit some artifacts, but the result according to aspects of the present disclosure has a more consistent color scheme and maintains the headband from the front view to the back view.

A run-time for TEXTure and a method (or an aspect) of the present disclosure were about 5 minutes, and Text2Tex with 20 update steps took about 20 minutes. The method of the present disclosure, TEXTure, and Text2Tex show less run-time compared to Dream-Fusion or Fantasia 3D, which may take hours and require multiple GPUs and hours of optimization. Primary costs of the method of the present disclosure include GAN inversion that takes about 4 minutes, the diffusion process that takes about 40 seconds, and back projection that takes 20 seconds.

As mentioned above, ablations may be applied in some aspects of the present disclosure. In an aspect, multiple hyperparameters in the method (e.g., consistent latent diffusion) of the disclosure may be ablated. Depending on UV parameterization, and the specific mesh, the parameters may be tuned to produce much higher quality textures. An example quantitative comparison is shown in FIG. 5 in which the ablation of the present disclosure is measured by using CLIP-Score as a metric.

In an aspect, the guidance scale may be adjusted. It is noted that the diffusion model sometimes produces results that are too varied. Like Score Distillation Sampling, the guidance scale may be adjusted, such as be increased. The increased guidance scale may somewhat mitigate an inconsistent output from the diffusion model and reduce blurring in a final result. Guidance scales of 7.5, 20, and 32 were tested. It was found that if 7.5 is blurry, 20 and 32 may lead to a higher consistency at a cost of over-saturated colors, which is a known issue for diffusion models.

In an aspect, a texture size may be adjusted. Since the UV parameterization is not guaranteed to effectively use the texture space uniformly or efficiently, a size of a latent texture may change the quality of the final output. To demonstrate the importance of selecting a good latent texture size, texture sampling may be performed on a single cube model. The single cube model may only use two-thirds of the texture space, and each face may use one-ninth of the texture space. When a single face is observed, the single face may have significantly fewer pixels than the 64×64 images that are required by Stable Diffusion. The fewer pixels in the single face may lead to poor results. In the disclosure, it is demonstrated that fewer pixels in the single face may only be present when a texture size is too low. When the texture size is increased, the single face may look normal. It is also demonstrated that if each texture has too many texels, each view may no longer correspond with any other view.

In an aspect, camera views may be adjusted by using multiple different camera views. For some examples, the number of cameras may be adjusted during the MultiDiffusion and backprojection step, such as 8, 16, and 32 camera views. It is observed that the increased number of cameras may reduce high-frequency detail but remove seams between views.

In an aspect, selection of a spherical harmonic may be conducted. Spherical harmonics may also improve the quality for some models. It was observed that, for some models, the spherical harmonics may improve the performance, but for others it may not, such as when the texture size already allows the model to have per-view independence. In an example, an increased order of the spherical harmonics may preserve more high-frequency detail for some meshes.

In an aspect, flat camera sampling may be applied. In the disclosure, cameras sampled entirely on the XZ plane were tested. It is observed that, for some models, the flat camera sampling may produce a more coherent output, as the flat camera sampling may reduce stretching due to camera elevation. On the other hand, using flat cameras may lead to more areas to be untextured. For some models, more untextured areas may not be problematic, but for other models that are textured, more untextured areas may be an issue.

In the disclosure, consistent latent diffusion for mesh texturing is provided. The consistent latent diffusion for mesh texturing may be extended from MultiDiffusion for mesh texturing and retain expressiveness from 2D diffusion models. Aspects of the disclosure may have a same speed as TEXTure and have a higher consistency. The disclosed consistent latent diffusion may be robust to a variety of prompts for a fixed mesh and be able to handle arbitrary camera positions to cover an entire mesh surface. Thus, the disclosed consistent latent diffusion may enable games to generate a variety of assets more cheaply for the games.

Figure 7:
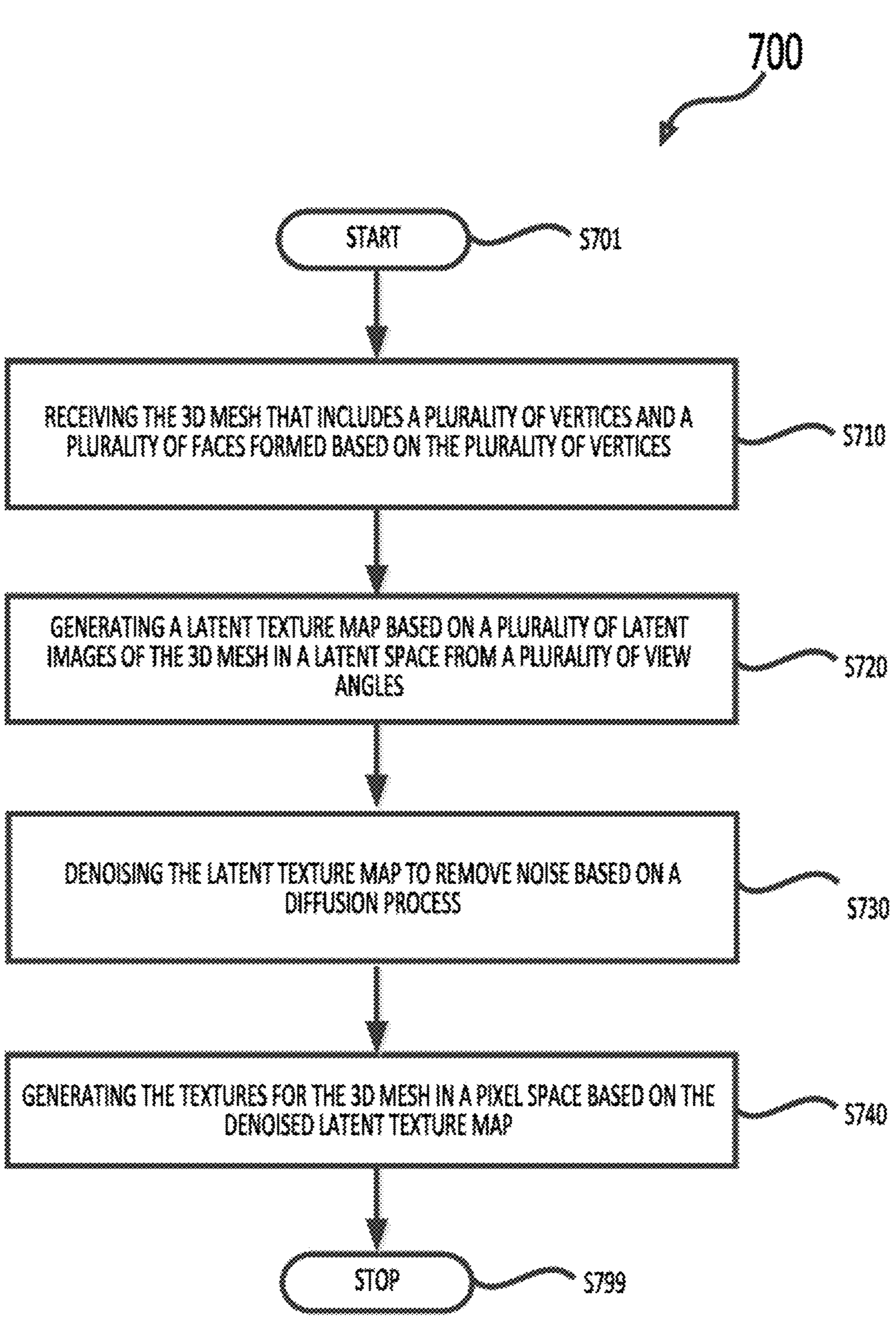
FIG. 7 shows a flow chart outlining an example of a process for generation of textures of a three-dimensional (3D) mesh.

FIG. 7 shows a flow chart of a process (700) for generating textures for a 3D mesh according to some aspects. The textures may be generated for the 3D mesh based on a consistent latent diffusion. The process may be implemented by an information processing apparatus or instructions stored on a computer-readable storage medium.

As shown in FIG. 7, the process (700) may start from (S701) and proceed to (S710).

At (S710), the 3D mesh is received. The 3D mesh includes a plurality of vertices and a plurality of faces. The plurality of faces is formed based on the plurality of vertices.

At (S720), a latent texture map is generated based on a plurality of latent images of the 3D mesh in a latent space from a plurality of view angles.

At (S730), the latent texture map is denoised to remove noise based on a diffusion process.

At (S740), the textures are generated for the 3D mesh in a pixel space based on the denoised latent texture map.

In an example, to generate the latent texture map, the latent texture map is generated based on rendered textures of the 3D mesh in the pixel space for the plurality of view angles. The latent texture map includes latent textures of the 3D mesh and a plurality of independent identically distributed (I. I. D.) Gaussian noises. Each of a plurality of latent pixels in the latent texture map includes a respective latent value. A spherical harmonic coefficient is determined for each of the latent values of the plurality of latent pixels in the latent texture map based on the view angle associated with the respective latent value.

In an example, a selected region of each of the plurality of latent images of the latent texture map includes a same set of the I. I. D. Gaussian noises.

In an example, to determine the spherical harmonic coefficient, a spherical harmonic coefficient is determined for a latent value of a latent pixel of the latent pixels based on the latent value of the latent pixel in the latent texture map and a real Legendre polynomial of a predefined order. For example, the spherical harmonic coefficient for the latent value of the latent pixel is determined as $$SH_{u,v}(\theta, \phi) = \sum_{\ell=0}^{N} \sum_{m=-\ell}^{\ell} SH[u, v] Y_\ell^m(\theta, \phi),$$

where [u, v] is the latent value of the latent pixel of the latent pixels in the latent texture map, $Y_\ell^m$ is the real Legendre polynomial of the predefined order $\ell$, and $(\theta,\phi)$ indicates a view angle of the view angles.

In an example, to denoise the latent texture map, latent textures are rendered into a first latent image of the plurality of latent images of the latent texture map. The first latent image is generated for a first view angle. The latent textures of the first latent image in a selected region of the first latent image are denoised. The selected region is defined by a mask. Updated textures of the first latent image are generated based on the denoised latent textures.

In an example, to generate the updated textures of the first latent image, differences between the denoised latent textures and rendered latent textures are determined by projecting the denoised latent textures onto the rendered latent textures in the first latent image. The updated textures of the first latent image are generated based on the determined differences.

In an example, to denoise the latent texture map, a spherical harmonic coefficient is determined for each of latent values of a plurality of latent pixels in the updated textures of the first latent image with weighted least squares. The latent texture map is denoised based on a least square of weighted updated textures of the first latent image and a weighted view angle of the first view angle. For example, the latent texture map is denoised as $$U_{i+1} = (1-\alpha) Lstsq(wT_{i+1,j}, wV) + \alpha Lstsq_{order0}(wT_{i+1,j}, wV),$$

where $U_{i+1}$ is the denoised latent texture map, $\alpha$ is a factor, w is a weight factor, $T_{i+1,j}$ is the updated textures of the first latent image, and V is the view angle of the first view angle.

In an example, to generate the textures for the 3D mesh, a weighted average texture of the updated textures of the plurality of latent images in the denoised latent texture map is determined. A gradient is determined. The gradient indicates a minimum difference between the weighted average texture and the updated textures of each of the plurality of latent images. The updated textures of the plurality of latent images are optimized based on the determined gradient to generate optimized textures of the plurality of latent images.

In an example, to determine the weighted average texture, the updated textures of the plurality of latent images are decoded into the pixel space to generate a plurality of pixel images. A difference between each pair of shared regions in the plurality of pixel images is determined. The weighted average texture is determined as an average of weighted differences between the pairs of shared regions in the plurality of the pixel images.

In an example, to generate the textures for the 3D mesh, the optimized textures of the plurality of latent images are decoded into the pixel spaces to generate a plurality of RGB images in the pixel space. The plurality of RGB images includes textures. A number of samples in the plurality of RGB images is greater than a number of samples in the plurality of latent images.

In an example, to generate the textures for the 3D mesh, the plurality of RGB images is projected onto the 3D mesh to generate an RGB texture map of the 3D mesh. Differences between the textures of the plurality of RGB images and rendered textures of the 3D mesh are determined. The rendered textures of the 3D mesh are rendered for the plurality of view angles. The textures of the plurality of RGB images in the RGB texture map are updated to generate the textures of the 3D mesh based on the differences between the textures of the plurality of RGB images and the rendered textures of the 3D mesh.

Then, the process proceeds to (S799) and terminates.

The process (700) may be suitably adapted. Step(s) in the process (700) may be modified and/or omitted. Additional step(s) may be added. Any suitable order of implementation may be used.

The techniques described above, can be implemented as computer software using computer-readable instructions and physically stored in one or more computer-readable media. For example, FIG. 8 shows a computer system (800) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
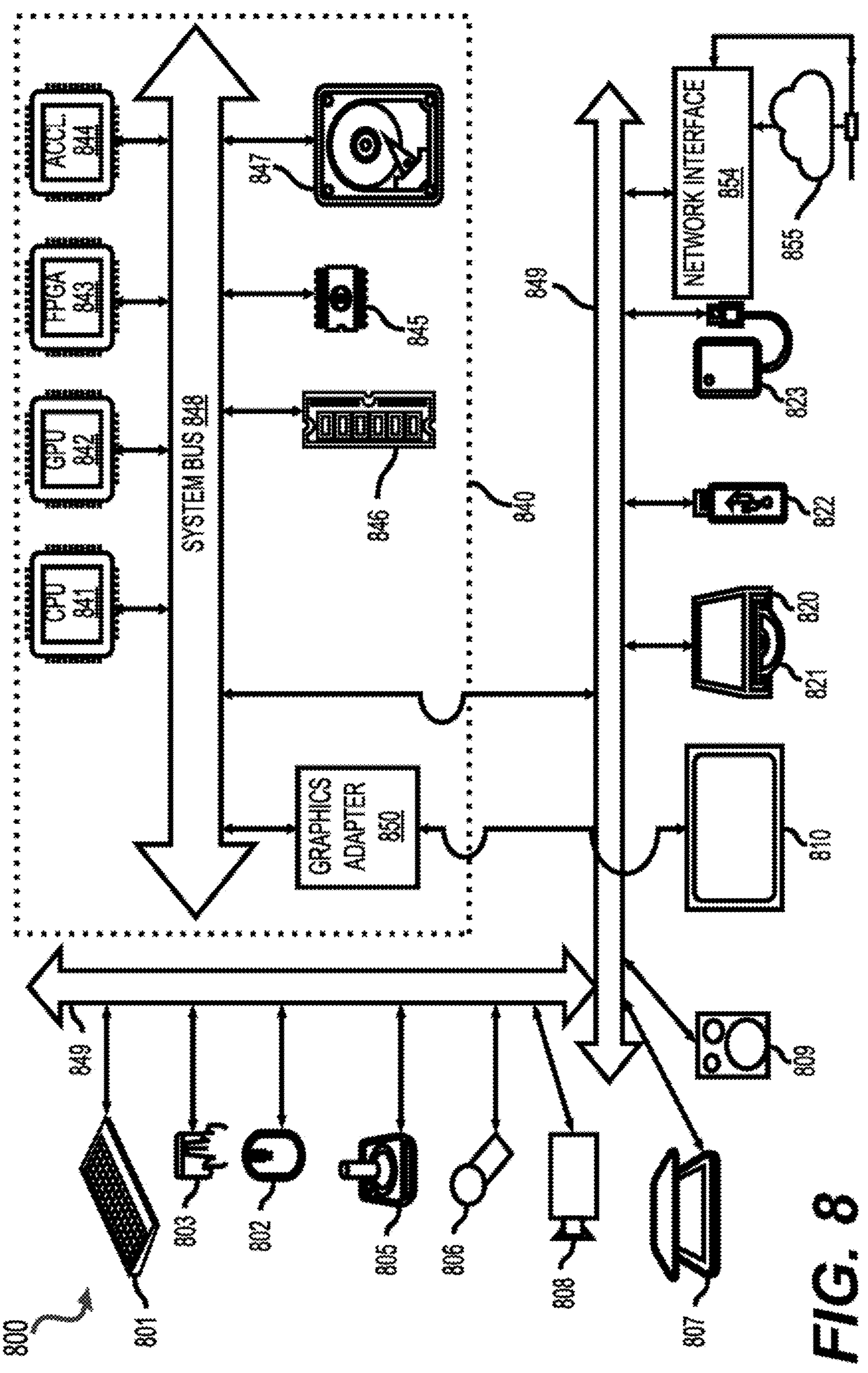
FIG. 8 is a schematic illustration of a computer system in accordance with some aspects.

The components shown in FIG. 8 for computer system (800) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include an interface (854) to one or more communication networks (855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), graphics adapters (850), and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). In an example, the screen (810) can be connected to the graphics adapter (850). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various aspects of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of generating textures for a three-dimensional (3D) mesh, the method comprising:
- receiving the 3D mesh that includes a plurality of vertices and a plurality of faces formed based on the plurality of vertices;
- generating a latent texture map based on a plurality of latent images of the 3D mesh in a latent space from a plurality of view angles;
- denoising the latent texture map to remove noise based on a diffusion process; and
- generating the textures for the 3D mesh in a pixel space based on the denoised latent texture map.

2. The method of claim 1, wherein the generating the latent texture map further comprises:
- generating the latent texture map based on rendered textures of the 3D mesh in the pixel space for the plurality of view angles, the latent texture map including latent textures of the 3D mesh and a plurality of independent identically distributed (I. I. D.) Gaussian noises, each of a plurality of latent pixels in the latent texture map including a respective latent value; and
- determining a spherical harmonic coefficient for each of the latent values of the plurality of latent pixels in the latent texture map based on the view angle associated with the respective latent value.

3. The method of claim 2, wherein a selected region of each of the plurality of latent images of the latent texture map includes a same set of the I. I. D. Gaussian noises.

4. The method of claim 1, wherein the denoising further comprises:
- rendering latent textures into a first latent image of the plurality of latent images of the latent texture map, the first latent image being generated for a first view angle;
- denoising the latent textures of the first latent image in a selected region of the first latent image, the selected region being defined by a mask; and
- generating updated textures of the first latent image based on the denoised latent textures.

5. The method of claim 4, wherein the generating the updated textures of the first latent image further comprises:
- determining differences between the denoised latent textures and rendered latent textures by projecting the denoised latent textures onto the rendered latent textures in the first latent image; and generating the updated textures of the first latent image based on the determined differences.

6. The method of claim 5, wherein the denoising further comprises:

determining a spherical harmonic coefficient for each of latent values of a plurality of latent pixels in the updated textures of the first latent image with weighted least squares; and denoising the latent texture map based on a least square of weighted updated textures of the first latent image and a weighted view angle of the first view angle.

7. The method of claim 4, wherein the generating the textures for the 3D mesh further comprises:

determining a weighted average texture of the updated textures of the plurality of latent images in the denoised latent texture map;

determining a gradient that indicates a minimum difference between the weighted average texture and the updated textures of each of the plurality of latent images; and optimizing the updated textures of the plurality of latent images based on the determined gradient to generate optimized textures of the plurality of latent images.

8. The method of claim 7, wherein the determining the weighted average texture further comprises:

decoding the updated textures of the plurality of latent images into the pixel space to generate a plurality of pixel images;

determining a difference between each pair of shared regions in the plurality of pixel images; and determining the weighted average texture as an average of weighted differences between the pairs of shared regions in the plurality of the pixel images.

9. The method of claim 7, wherein the generating the textures for the 3D mesh further comprises:

decoding the optimized textures of the plurality of latent images into the pixel spaces to generate a plurality of RGB images in the pixel space, the plurality of RGB images including textures, a number of samples in the plurality of RGB images being greater than a number of samples in the plurality of latent images.

10. The method of claim 9, wherein the generating the textures for the 3D mesh further comprises:

projecting the plurality of RGB images onto the 3D mesh to generate an RGB texture map of the 3D mesh;

determining differences between the textures of the plurality of RGB images and rendered textures of the 3D mesh that are rendered for the plurality of view angles; and updating the textures of the plurality of RGB images in the RGB texture map to generate the textures of the 3D mesh based on the differences between the textures of the plurality of RGB images and the rendered textures of the 3D mesh.

11. An apparatus for generating textures for a three-dimensional (3D) mesh, the apparatus comprising:

processing circuitry configured to:

receive the 3D mesh that includes a plurality of vertices and a plurality of faces formed based on the plurality of vertices;

generate a latent texture map based on a plurality of latent images of the 3D mesh in a latent space from a plurality of view angles;

denoise the latent texture map to remove noise based on a diffusion process; and generate the textures for the 3D mesh in a pixel space based on the denoised latent texture map.

12. The apparatus of claim 11, wherein the processing circuitry is configured to:

generate the latent texture map based on rendered textures of the 3D mesh in the pixel space for the plurality of view angles, the latent texture map including latent textures of the 3D mesh and a plurality of independent identically distributed (I. I. D.) Gaussian noises, each of a plurality of latent pixels in the latent texture map including a respective latent value; and determine a spherical harmonic coefficient for each of the latent values of the plurality of latent pixels in the latent texture map based on the view angle associated with the respective latent value.

13. The apparatus of claim 12, wherein a selected region of each of the plurality of latent images of the latent texture map includes a same set of the I. I. D. Gaussian noises.

14. The apparatus of claim 11, wherein the processing circuitry is configured to:

render latent textures into a first latent image of the plurality of latent images of the latent texture map, the first latent image being generated for a first view angle;

denoise the latent textures of the first latent image in a selected region of the first latent image, the selected region being defined by a mask; and generate updated textures of the first latent image based on the denoised latent textures.

15. The apparatus of claim 14, wherein the processing circuitry is configured to:

determine differences between the denoised latent textures and rendered latent textures by projecting the denoised latent textures onto the rendered latent textures in the first latent image; and generate the updated textures of the first latent image based on the determined differences.

16. The apparatus of claim 15, wherein the processing circuitry is configured to:

determine a spherical harmonic coefficient for each of latent values of a plurality of latent pixels in the updated textures of the first latent image with weighted least squares; and denoise the latent texture map based on a least square of weighted updated textures of the first latent image and a weighted view angle of the first view angle.

17. The apparatus of claim 14, wherein the processing circuitry is configured to:

determine a weighted average texture of the updated textures of the plurality of latent images in the denoised latent texture map;

determine a gradient that indicates a minimum difference between the weighted average texture and the updated textures of each of the plurality of latent images; and optimize the updated textures of the plurality of latent images based on the determined gradient to generate optimized textures of the plurality of latent images.

18. The apparatus of claim 17, wherein the processing circuitry is configured to:

decode the updated textures of the plurality of latent images into the pixel space to generate a plurality of pixel images;

determine a difference between each pair of shared regions in the plurality of pixel images; and determine the weighted average texture as an average of weighted differences between the pairs of shared regions in the plurality of the pixel images.

19. The apparatus of claim 17, wherein the processing circuitry is configured to:

decode the optimized textures of the plurality of latent images into the pixel spaces to generate a plurality of RGB images in the pixel space, the plurality of RGB images including textures, a number of samples in the plurality of RGB images being greater than a number of samples in the plurality of latent images.

20. A non-transitory computer readable storage medium storing instructions which when executed by at least one processor cause the at least one processor to perform:

receiving a three-dimensional (3D) mesh that includes a plurality of vertices and a plurality of faces formed based on the plurality of vertices;

generating a latent texture map based on a plurality of latent images of the 3D mesh in a latent space from a plurality of view angles;

denoising the latent texture map to remove noise based on a diffusion process; and generating textures for the 3D mesh in a pixel space based on the denoised latent texture map.

* * * * *